Figure 1:
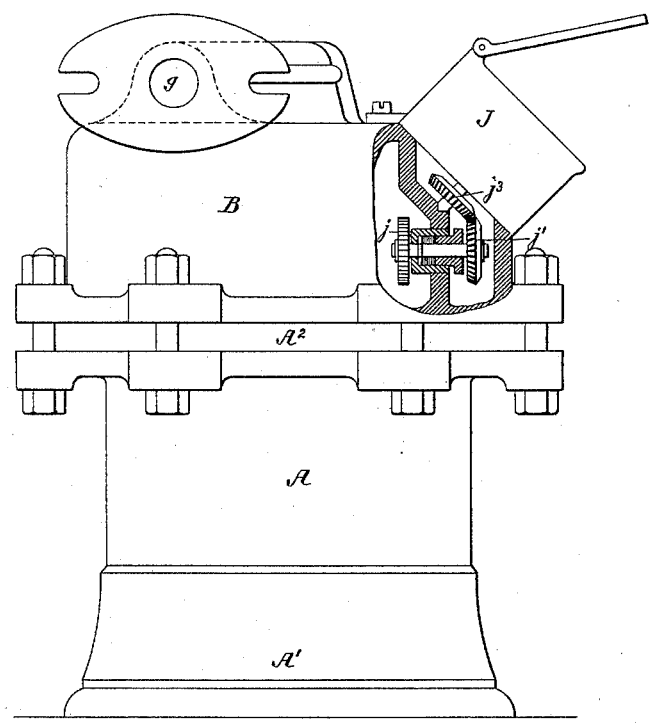

(No Model.) 5 Sheets—Sheet 1.

A. BONNA.
PISTON METER.

No. 441,925. Patented Dec. 2, 1890.

Witnesses:
E. J. Griswold
Geo. A. Crane

Inventor:
Aimé Bonna
by his Attorneys
Howson and Sons (No Model.) 5 Sheets—Sheet 2.
A. BONNA.
PISTON METER.

No. 441,925. Patented Dec. 2, 1890.

Witnesses:
E. J. Griswold
Geo. A. Crane.

Inventor:
Aimé Bonna
by his Attorneys
Howson and Sons (No Model.)  5 Sheets—Sheet 3.

A. BONNA.
PISTON METER.

No. 441,925.  Patented Dec. 2, 1890.

Witnesses:
E. J. Griswold
Geo. A. Crane

Inventor:
Aimé Bonna
by his Attorneys
Howson and Sons (No Model.) 5 Sheets—Sheet 4.

A. BONNA.
PISTON METER.

No. 441,925. Patented Dec. 2, 1890.

Witnesses:
E. J. Griswold.
Geo. A. Crane.

Inventor
Aimé Bonna
by his Attorneys
Howson and Sons (No Model.) 5 Sheets—Sheet 5.

A. BONNA.
PISTON METER.

No. 441,925. Patented Dec. 2, 1890.

Witnesses:
E. J. Griswold
Geo. A. Crane

Inventor:
Aimé Bonna
by his Attorneys
Howson and Sons

UNITED STATES PATENT OFFICE.

AIMÉ BONNA, OF PARIS, FRANCE, ASSIGNOR TO MacFARLANE, STRANG & CO., OF GLASGOW, SCOTLAND.

PISTON METER.

SPECIFICATION forming part of Letters Patent No. 441,925, dated December 2, 1890.

Application filed October 29, 1887. Serial No. 253,800. (No model.) Patented in France February 4, 1886, No. 173,965; in England September 13, 1886, No. 11,628; in Germany December 28, 1886, No. 38,020, and January 23, 1887, No. 40,502; in Belgium July 29, 1887, No. 74,030; in Canada September 6, 1887, No. 27,600, and in Austria-Hungary October 14, 1887, No. 12,229 and No. 45,643.

*To all whom it may concern:*

Be it known that I, AIMÉ BONNA, a citizen of the Republic of France, residing at Paris, France, have invented certain Improvements in Water and other Fluid Meters, (for which I have obtained Letters Patent in Great Britain, No. 11,628, dated September 13, 1886; in Belgium, No. 74,030, dated July 29, 1887; in Germany, No. 38,020, dated December 28, 1886, and No. 40,502, dated January 23, 1887; in Canada, No. 27,600, dated September 6, 1887; in Austria-Hungary, No. 12,229 and No. 45,643, dated October 14, 1887, and in France, No. 173,965, dated February 4, 1886, with patent of addition in France, dated July 17, 1886,) of which the following is a specification.

My invention has reference to improvements in the construction of meters of the class in which pressure of the water or other fluid to be measured reciprocates a piston to and fro within a cylinder and measures the quantity of fluid contained in the cylinder for each single and double stroke of the piston by the action of the liquid itself passing in and out of the cylinder, so that the quantity of fluid passed through the meter is indicated by counting or registering wheels, index-pointers, and dials.

The main object of my invention is to improve the construction of a fluid-meter of this general character, and among some of the principal parts of my meter are a measuring-cylinder having a reciprocating piston, a small auxiliary cylinder and piston, and a distributing-valve chest for each cylinder, arranged so that the action of the piston of the measuring-cylinder actuates the controlling-valve of the auxiliary cylinder, the piston of the latter in turn actuating the controlling-valve of the measuring-cylinder, all automatically, so as to give a continuous positive reciprocating motion to both pistons and a measuring action to the main cylinder as long as the water or other pressure fluid is turned or set on to pass through the machine.

Figure 2:
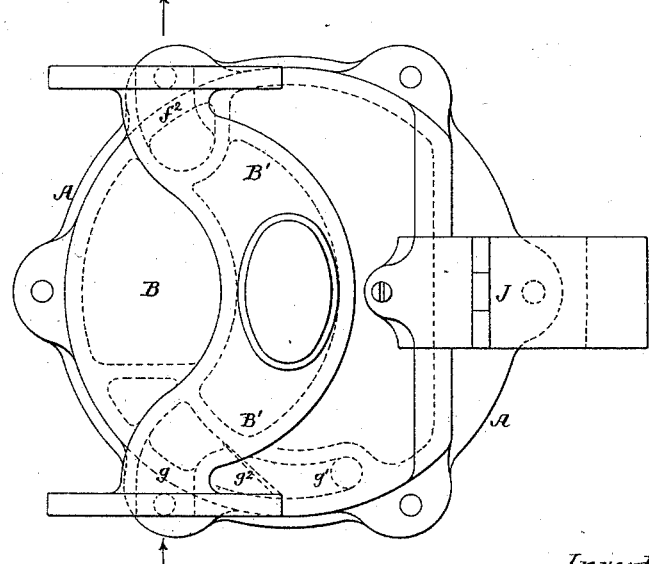
Figure 3:
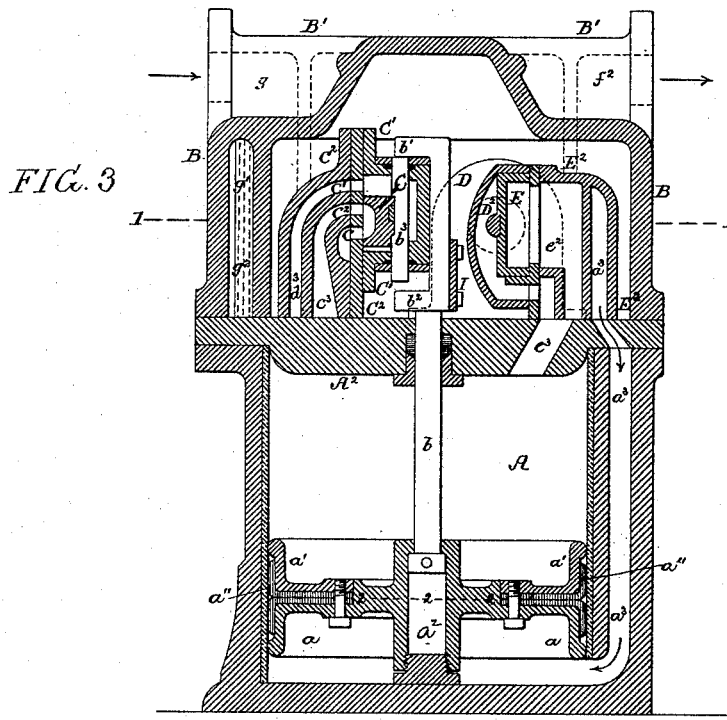
Figure 4:
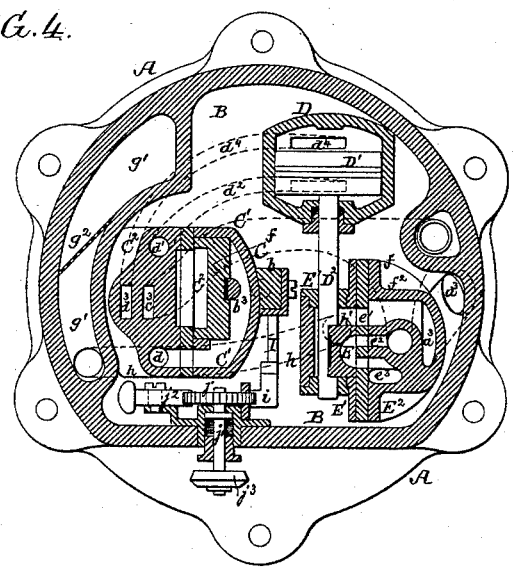
Figure 6:
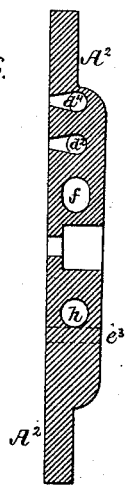
Figure 5:
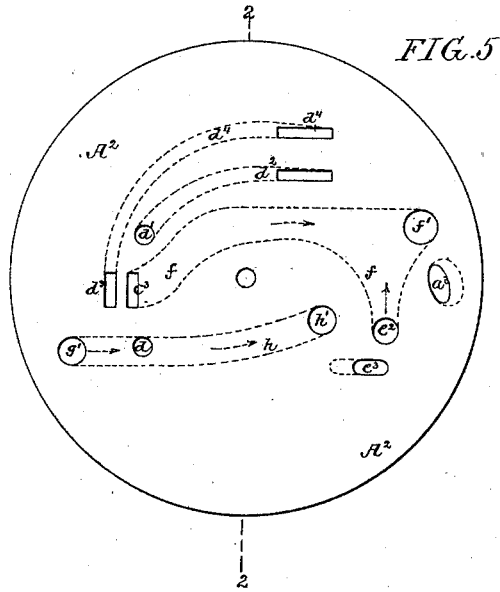
Figure 7:
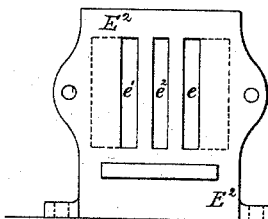
Figure 8:
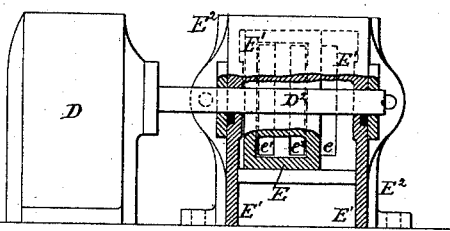
Figure 9:
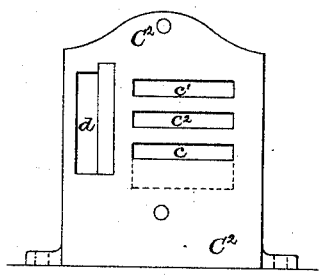
Figure 10:
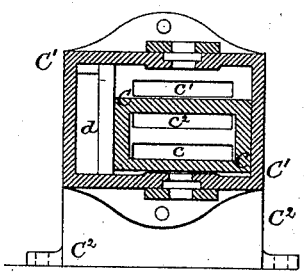
Figure 11:
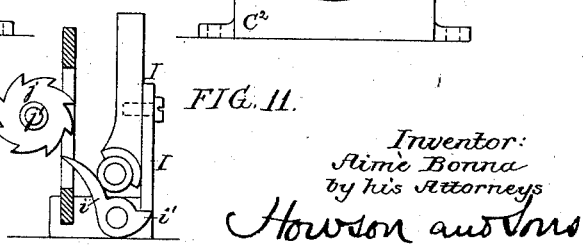
Figure 12:
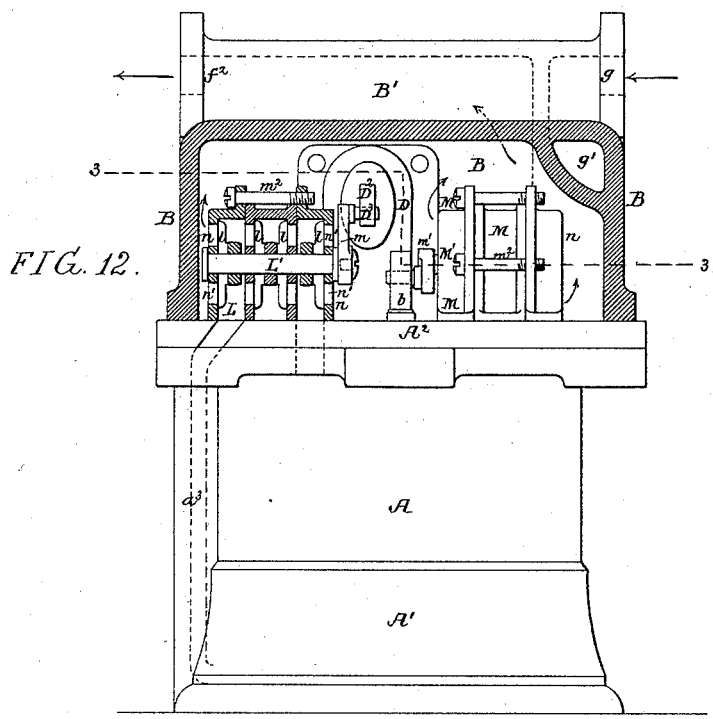
Figure 13:
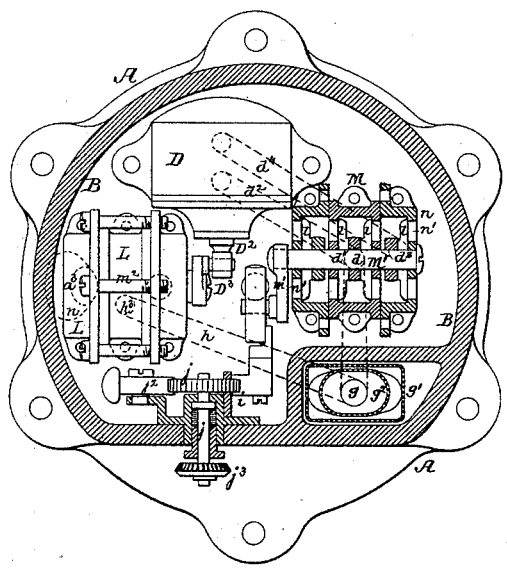
Figure 14:
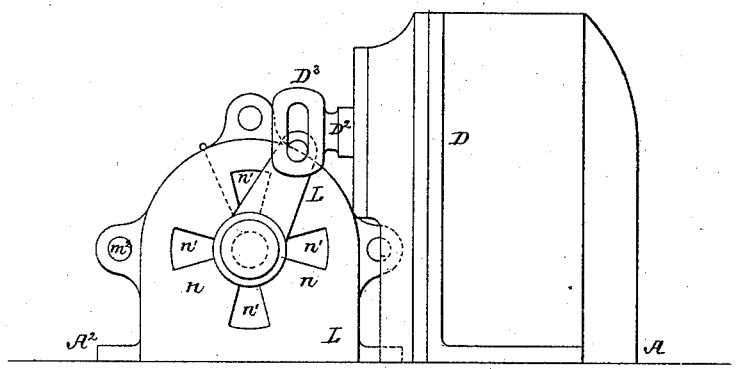
Figure 15:
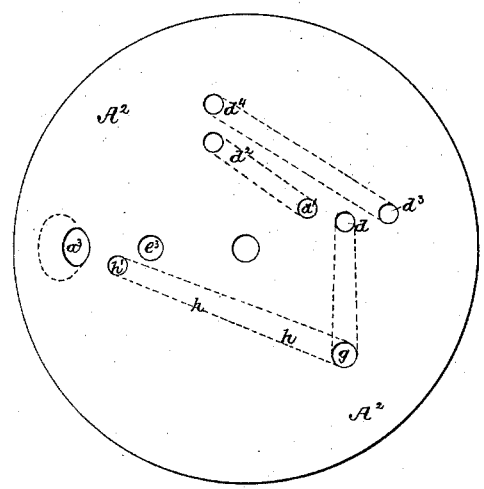
Figure 16:
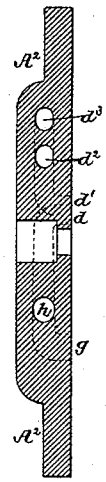

In the accompanying drawings, Figure 1 represents a side elevation, partly in section, of my improved meter. Fig. 2 is a plan view. Fig. 3 is a sectional elevation at right angles to the plane of Fig. 1. Fig. 4 is a sectional plan taken on the line 1 1 of Fig. 3. Fig. 5 is a top view of the intermediate ported plate $A^2$, and Fig. 6 a transverse section taken on line 2 2 of Fig. 5. Figs. 7 to 11 are detail views. Fig. 12 shows an elevation, partly in section, of a modification, and Fig. 13, a horizontal section taken near the line 3 3 of Fig. 12. Fig. 14 is a vertical elevation at right angles to the plane of Fig. 12. Fig. 15 is a top view of the intermediate cover $A^2$ in the modification, and Fig. 16 a transverse section thereof.

The measuring-cylinder A is placed vertically, as shown in Figs. 1 and 3, with a closed bottom A', on which it stands. It is lined with brass and fitted with a piston $a\ a'$, having double-cupped leathers $a''$, secured by screw bolts or pins in the center of the annular disk-ring $a$, part of the leather entering recesses formed in the circumferential head of the piston $a\ a'$, which may be formed with enlarged turned parts at the upper and lower edges to form metallic guides, both working on the inner surface of the cylinder A. The piston may be formed in two halves at the dotted line 2 2, Fig. 3, and the leather packing secured between them by the same bolts shown for securing the annular ring $a'$. The piston $a\ a'$ is preferably formed with a deep bore $a^3$, having a screw-plug at the lower end and the upper end closed around the piston-rod $b$. This piston-rod $b$ has a head or enlarged abutting end sliding within the bore $a^2$, so that there is a lost motion between the two; or, in other words, the piston $a\ a'$ is moved to and fro for a great part of its stroke without moving the piston-rod $b$. The piston-rod $b$ passes up through a stuffing-box in the intermediate plate $A^2$ into the top chamber B. Within this chamber B are contained the small cylinder D, its controlling-valve casing and chest $C'\ C^2$, and the controlling-valve casing and chest $E'\ E^2$ of the cylinder A. The lost motion or play between the piston-rod $b$ and the piston $a\ a'$ is such that the piston $a\ a'$ moves the piston-rod $b$ only when it comes sufficiently near the end of its stroke in either direction up or down to make the projecting tappets $b'$ $b^2$ on the top end of the piston-rod $b$ reverse the slide-valve C in the distributing-valve chest C' of the small cylinder D. The piston-rod D' of the cylinder D in reversing will by the projecting end of its piston-rod $D^2$ instantly reverse the valve E in the valve-chest E' of the measuring-cylinder A.

The ports $e$ $e'$ $e^2$ of the valve-chest E' have their longest dimensions in a vertical direction, and the ports $c$ $c'$ $c^2$ of the valve-chest C' have their longest dimension in a horizontal direction, as shown in Figs. 7 and 8, and Figs. 9 and 10, respectively. The valve-faces C and E being vertical, no sediment or other obstruction can rest on them to interfere with the proper action of the valves. A wire or perforated partition $g^2$ is inserted in the chamber $g'$ of the inlet-duct $g$ to prevent any matter from entering with the water. This wire or perforated partition can be removed to be cleaned.

The water from the inlet branch $g$ in the upper case B B' is led through a duct-recess $h$ in the central cover or plate $A^2$ (see dotted lines in Figs. 4 and 5,) and at $d$ and $h'$ up into the valve-chests C' E', preferably behind the valves C and E, so that any pressure of water would tend to keep the valves C and E close to the vertical working-faces of their ports. The water entering the end port $e$ of the valve-chest E' goes directly down through a port or opening $e^3$ in the cover $A^2$ into the cylinder A above the piston. The other end port $e'$ leads into a chamber in the valve-casing $E^2$, and the water entering this port passes through this chamber and down a passage $a^3$ to the cylinder A below the piston. The exhaust or outlet takes place from either end of the cylinder A through these end ports $e$ $e'$ and the center chamber in the slide-valve E into the center port $e^2$, thence to the outlet-duct $f$ in the body of the central cover $A^2$, and through ducts $f'$ $f^2$ to the discharge branch at one side of the upper part B' of the top chest B.

The construction and working of the valve-chest C' $C^2$ and the slide-valve C are the same except that the valve C and ports $c$ $c'$ $c^2$ are placed with their longest dimension horizontal instead of vertical. The water enters the valve-chest C' by the vertical side port $d$ from the inlet-channel $h$. The water entering the lower port $c$ passes through the vertical side port $d'$ and the channel $d^2$ in the cover $A^2$ to the inner end of the cylinder D, while that entering the upper port $c'$ passes to the outer end of the cylinder D through the back vertical port $d^3$ in the chest $C^2$ and the channel $d^4$ in the cover $A^2$. The exhaust or outlet takes place through the central chamber in the valve C and central port $c^2$ down through the vertical port $c^3$ into the channel $f$ and discharge-ports $f'$ $f^2$. The piston D', with its piston-rod $D^2$, only requires to move enough to reverse the slide-valve E, and the small quantity of water needed in the cylinder D for this purpose passes out with the water discharged from the cylinder A and is measured and registered therewith.

A small lateral bracket I, secured on the top of the piston-rod $b$ of the measuring-cylinder A, carries an oscillating actuating-pawl $i$, with keel-check at $i'$, which retains it always in acting position. Each time the piston-rod $b$ rises the bracket I causes the pawl $i$ to act on the teeth of a ratchet-wheel $j$, so as to turn it one tooth at a time. This ratchet-wheel $j$ is mounted on the inner end of a light spindle $j'$, passing out through a stuffing-box in a bearing-bracket bolted to the inside of the upper case B. (Shown particularly in Figs. 1 and 4.) This bearing-bracket carries at the other side of the ratchet-wheel $j$ on a lateral stud a small oscillating counterweighted retaining-pawl $j^2$, which prevents the ratchet-wheel $j$ from turning backward and insures its being actuated in the forward direction one tooth at a time, as before stated. The other end of the spindle $j'$ passes out into the chamber J of the indicating mechanism, which is secured on the outside of the upper case B at an angle of forty-five degrees for the better observation of the indices and has an inclosing-lid. A bevel-wheel on the outer end of the spindle $j'$ gears into a bevel-wheel $j^3$ on the first spindle of the train of wheels of the counting mechanism, which diminish in speed in the usual manner by tenths—that is, each wheel with the index-pointer on its spindle as it makes one revolution turns the next index-wheel one tooth of its ten divisions, and so on for each wheel and spindle in sequence for as many index-dials as are ranged in the counting mechanism.

To prevent the escape or leakage from the inlet water chamber or casings C' and E' through the holes for the rods $b^3$ and $D^2$, these holes are fitted with grooves and cup-leather or other soft or elastic packing-rings, and small springs of india-rubber or other equivalent are preferably fitted between the back of the valves C and E and a flattened part of their moving rods $b^3$ $D^2$ to press the valves liquid-tight to the faces of the inlet and outlet ports of the distributing-port chests $C^2$ and $E^2$, on which they work, to keep them tight. The tappets $b'$ $b^2$, which work said spindle $b^3$ outside the inlet-valve casing C', have a certain amount of "play" movement before touching and actuating the said spindle of the valve to give proper adjustment and action at each traverse of the reversing-piston D' and the valve C and regulate the action of the valve E.

Although the piston-rod $b$ has been described as connected to its piston by a sliding arrangement at $a^2$, it may be connected direct to its piston $a$ $a'$ in the ordinary manner and leave all the play or lost motion to take place between the tappets $b'$ $b^2$ and the valve C.

The working of the meter is as follows: Assuming the parts to be in the position shown in Figs. 3 and 4, the water entering from the inlet $g'$ through the ducts $h$ and $d$ to the valve-chest C' passes through the port $c'$, thence through ports $d^3$ and $d^4$ to the outer end of the cylinder D, thus forcing the piston D', with its piston-rod $D^2$, (which carries the valve E,) outward and opening the port $e'$ and connecting the ports $e$ and $e^2$. Then the water entering from the inlet $g'$ through the ducts $h h'$ to the valve-chest E' passes through the port $e'$ down through the port $a^3$ to the lower part of the measuring-cylinder A beneath the piston $a$ $a'$. As the piston $a a'$ is forced upward, the water in the upper part of the measuring-cylinder passes up through the port $e^3$ and the port $e$ into the D-chamber of the valve E (which is now joining the ports $e e^2$) and through the port $e^2$ to the outlet $f' f^2$. When the piston $a a'$ is forced up far enough to overcome the lost motion between it and the piston-rod $b$, the latter is pushed up, and the tappet $b^2$ strikes the spindle $b^3$, carrying the valve C, and reverses the valve C. The water in the valve-chest C' then passes through the port $c$, thence through the ports $d'$ and $d^2$ to the inner end of the cylinder D, and forces back the piston D', with its piston-rod $D^2$ and valve E, thus reversing the valve E. The water in the outer end of the cylinder D passes back through ports $d^4$, $d^3$, and $c'$ into the D-chamber of the valve C, (which is now connecting ports $c'$ and $c^2$,) thence through ports $c^2$ $c^3$ to outlet-ducts $f f' f^2$. The valve E, being reversed, opens the port $e$ and connects the ports $e'$ and $e^2$. The water in the valve-chest E' now enters the port $e$ and passes down through port $e^3$ to the measuring-cylinder above the piston $a a'$, forcing the piston down until the lost motion between it and the piston-rod $b$ is overcome, when the piston carries the piston-rod down, thus causing the tappet $b'$ to strike the upper end of the spindle $b^3$ and reverse the valve C again, and so on. The water in the lower part of the measuring-cylinder, being forced out by the descending piston, passes up through the ports $a^3$ and $e'$ into the D-chamber in valve E and through port $e^2$ to outlets $f f' f^2$.

As a modification of the above-described construction, I may use disk-valves $l l l$, mounted within triple circular-chamber inlet and distributing or outlet valve chests L M, Figs. 12 to 16, inclusive. The valves have vertical face-plates $n$ and radial ports $n'$, all in axial line, so that all the valves of each chest L and M are mounted on one horizontal axial spindle L' M', each oscillated by a crank-pin lever $m$ and $m'$, connected to the outer ends of the piston-rods $D^2$ and $b$ of the controlling and measuring cylinders D and A, respectively. The three circular chambers of each set of valve-chests L M are bolted together by longitudinal bolts $m^2$, and the whole bolted or jointed down to the upper face of the intermediate plate $A^2$. The water or other motive fluid passes through the inlets $g'$, $h$, and $d$ to the central chamber of each set. The disk-valves $l l$ in the center chamber work over the ports leading to the end chambers alternately, and the disk-valves $l l$ in the end chambers work over ports $n'$ in their end face-plates $n$. When the ports leading from the center chamber to one of the end chambers are open, the ports leading from the center chamber to the other end chamber are closed, and vice versa, and in either end chamber, when the ports from the center chamber are open, the ports $n'$ in its end face-plate $n$ are closed, and vice versa. The valve-chambers on each side of the central inlet-chamber open directly to their respective ports $a^3 e^3$ and $d' d^2 d^3 d^4$, while the water exhausts through the ports $n'$ into the top chamber B and escapes through the outlet branch $f^2$, as indicated by the arrows in Fig. 12, or ducts may lead from the ports $n'$ down to a passage in the central plate $A^2$, and so on to the branch $f^2$, as in the former arrangement.

In addition to the pressure of the fluid, rubber or other springs may be mounted on the spindles L' and M' to press the disk-valves fluid-tight against their working port-faces in the valve-chests.

The piston D' of the small controlling-cylinder D is preferably constructed with two cupped leathers (or other equivalent material suitable for the acting fluid) secured much in the same manner as the leathers of the piston of the measuring-cylinder, but having its acting-rod $D^2$ secured to the piston D' in the ordinary manner.

In the modification with the oscillating disk-valves the piston-rod $D^2$ may be provided with a slotted end $D^3$, Fig. 14, in which works a pin projecting from the cranks $m m'$ of the spindles L' M', or short connecting-rods may be used between the piston-rod $D^2$ and the crank-pins $m m'$, or any equivalent, to change the reciprocating motion of the piston-rod into the oscillating or rotary motion of the valve-spindles.

All the important working parts of this meter—such as the piston-rods, valves, and valve-chests and their moving tappets and levers—would be made of gun-metal or other metal which would not be liable to the corrosive action of the water or pressure fluid used, and although the distribution-valves and valve-chests have all been described as ranged with their working-faces vertical they might be placed horizontally or at other angles.

I claim as my invention—

1. In a water or other fluid meter, a measuring-cylinder with a reciprocating piston, an auxiliary cylinder with a single piston, and valves and valve-chests for each cylinder, in combination with a separate intermediate removable plate provided with ducts for conveying the fluid from the inlet to the valve-chests, ducts to convey the fluid from the exhaust-ports of the valve-chests to the outlet, and passages connecting the measuring-cylinder with its valve-chest, all substantially as and for the purpose set forth.

2. In a water or other fluid meter, a measuring-cylinder with a reciprocating piston and a top chamber containing inlet and outlet chambers, an auxiliary cylinder with a single piston, the rod of which controls the valves for the measuring-cylinder, and valves and valve-chests for the two cylinders, in combination with an intermediate removable plate between the measuring-cylinder and the top chamber, the said plate containing ducts to connect the inlet-chamber to the valve-chests and the valve-chests to the outlet-chamber, and passages between the measuring-cylinder and its valve-chest, all substantially as and for the purposes set forth.

In testimony whereof I have signed my name to this specification in the presence of two subscribing witnesses.

AIMÉ BONNA.

Witnesses:
ROBT. M. HOOPER,
JEAN BRETONNEAU.